United States Patent
Kameyoshi et al.

(10) Patent No.: US 6,244,621 B1
(45) Date of Patent: *Jun. 12, 2001

(54) AIR BELT APPARATUS

(75) Inventors: Hikaru Kameyoshi, Genkon; Yoji Suyama; Daisuke Yoshioka, both of Shega, all of (JP)

(73) Assignee: Takata Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/145,276

(22) Filed: Sep. 2, 1998

(30) Foreign Application Priority Data

Sep. 2, 1997 (JP) .................................... 9-236904

(51) Int. Cl.[7] .................................... B60R 21/18
(52) U.S. Cl. .......................... 280/733; 280/804; 297/473
(58) Field of Search ................................ 280/728.1, 733, 280/801.1, 801.2, 804, 808, 805, 807; 297/468, 471, 473, 483

(56) References Cited

U.S. PATENT DOCUMENTS

| | | | |
|---|---|---|---|
| 3,836,168 | * 9/1974 | Nonaka et al. | 280/733 |
| 3,841,654 | 10/1974 | Lewis | 280/150 AB |
| 3,869,145 | * 3/1975 | Takada | 280/733 |
| 3,929,205 | 12/1975 | Takada | 180/82 C |
| 5,303,953 | * 4/1994 | Kamiyama et al. | 280/733 |
| 5,466,003 | * 11/1995 | Tanaka et al. | 280/733 |
| 5,474,326 | 12/1995 | Cho | 280/738 |
| 5,700,034 | * 12/1997 | Lane, Jr. | 280/805 |
| 5,851,055 | * 12/1998 | Lewis | 280/733 X |
| 5,924,729 | * 7/1999 | Gleason et al. | 280/805 |

FOREIGN PATENT DOCUMENTS

| | | | |
|---|---|---|---|
| 2032148 | * 6/1970 | (DE) | 280/733 |
| 3702976 | 8/1988 | (DE) . | |
| 5-85301 | 4/1993 | (JP) . | |
| 5-112200 | * 5/1993 | (JP) | 280/733 |
| 40604493 | * 3/1994 | (JP) | 280/733 |

* cited by examiner

Primary Examiner—Daniel G. DePumpo
Assistant Examiner—F. Zeender
(74) Attorney, Agent, or Firm—Foley & Lardner

(57) ABSTRACT

An air bag device that includes an inflatable shoulder belt 16 having an end in which a gas generator 30 is arranged. A retainer 32 holds the gas generator 30 and the shoulder belt 16 integrally. The gas generator 30 is movable along a guide rail 34. One end of the shoulder belt 16 is connected to a webbing 18, while the other end is connected to the lap belt 22. A retractor 20 retracts the webbing 18, while a retractor 24 retracts the lap belt 22. The tongue 26 is fastened to the buckle 28.

11 Claims, 14 Drawing Sheets

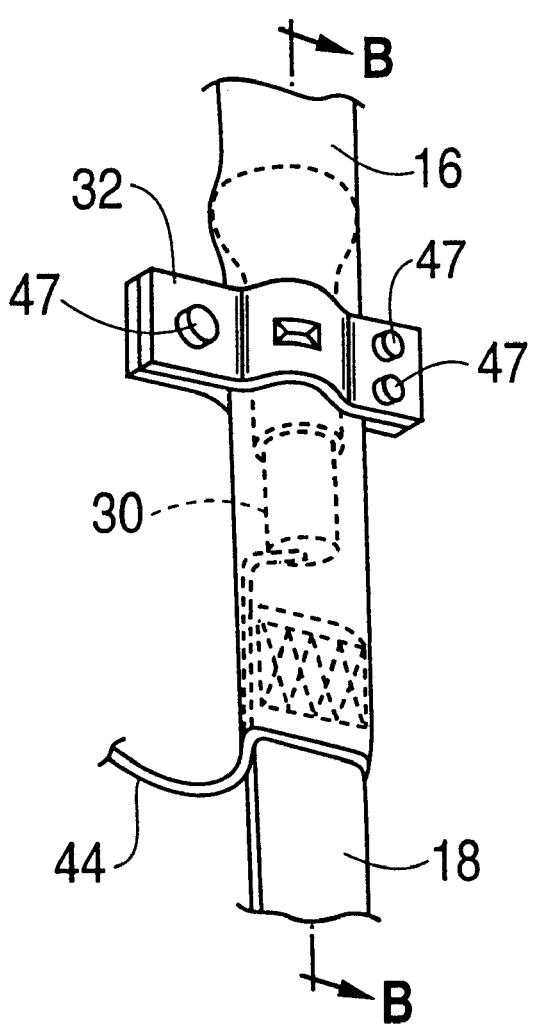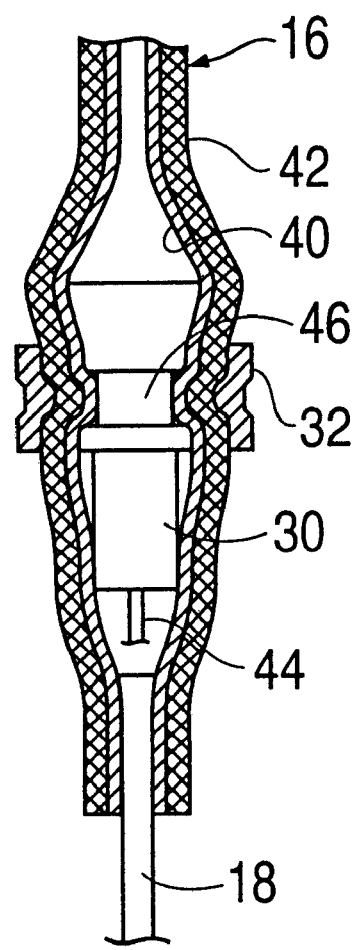

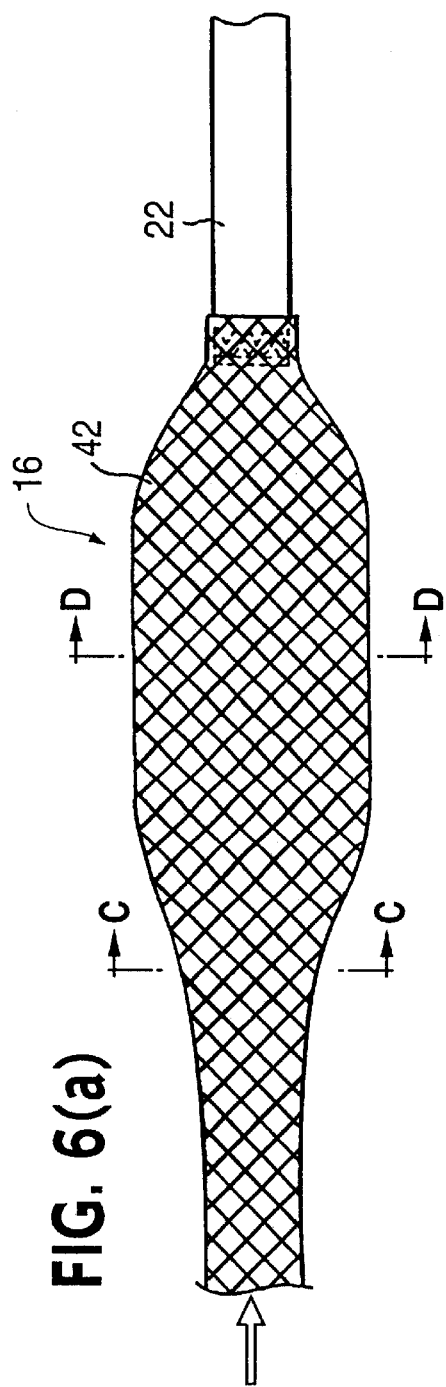
FIG. 6(a)
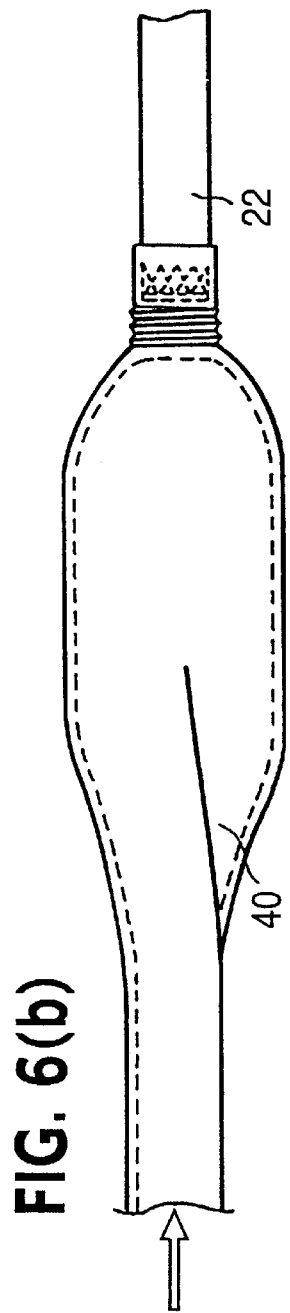
FIG. 6(b)
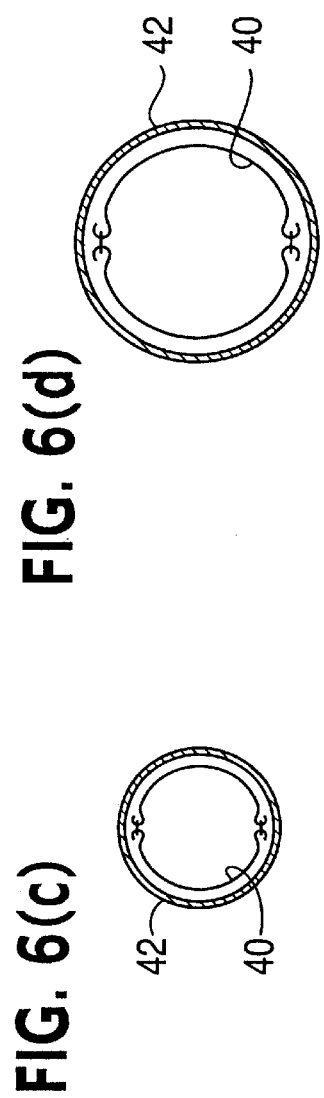
FIG. 6(d)
FIG. 6(c)

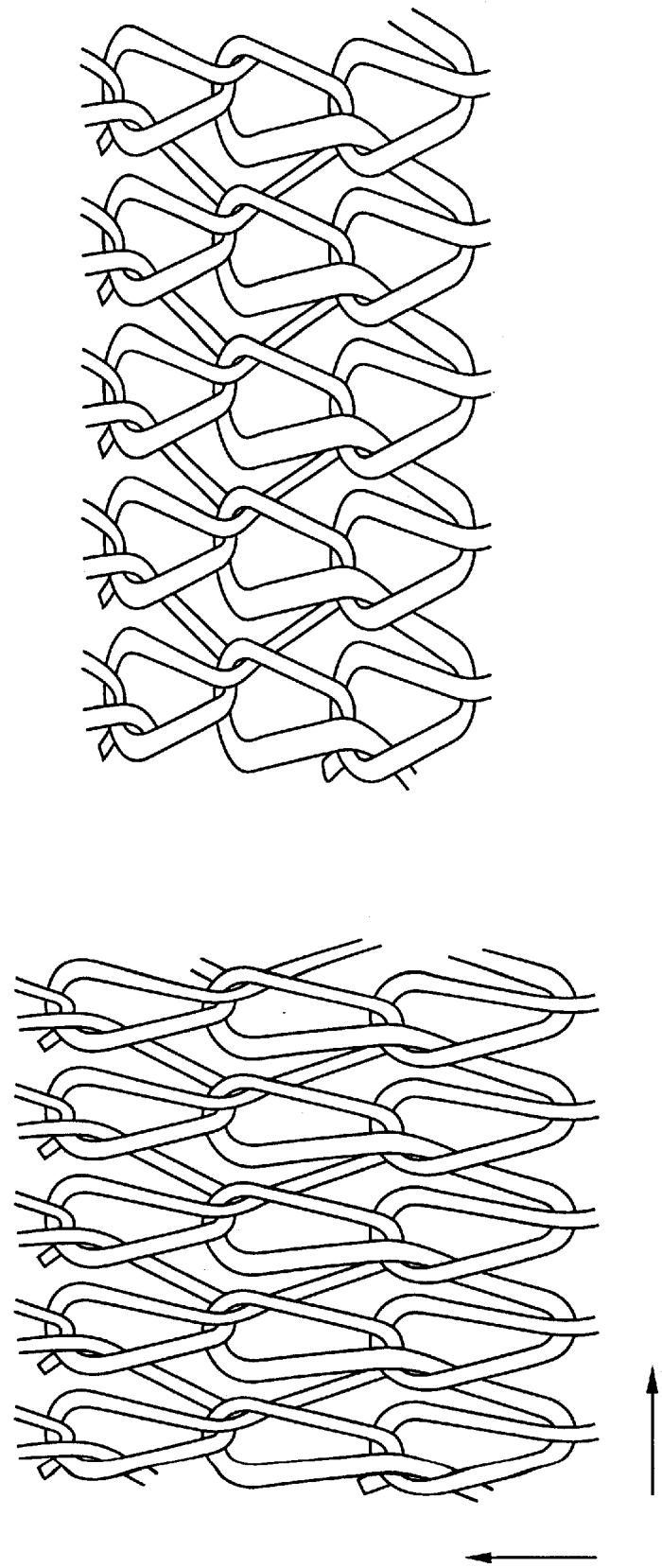

AIR BELT APPARATUS

BACKGROUND OF THE INVENTION

The present invention relates to seat belt devices for protecting automobile passengers during collisions, and more particularly, to an air belt device having a bag-like portion, which is inflated by gas generated by a gas generator.

More particularly, the present invention relates to an air belt device having a bag-like shoulder belt and a vertically movable gas generator installed at one end of the shoulder belt.

Japanese Unexamined Patent Publication No. 5-112200 describes a prior air belt device. A perspective view of the air belt device is shown in FIG. 12(a). A cross-sectional view of the air belt device taken along line B—B in FIG. 12(a) is shown in FIG. 12(b).

As shown in the drawings, an air belt device 1 extends from the right side of a passenger. The device 1 includes a shoulder belt 2, a seat belt retractor 3, a lap belt 4, a buckle 5, a tongue 6, a belt guide 7, a gas generator 8, and an adjustor 9. One end of the lap belt 4 is connected to the shoulder belt 2. The other end of lap belt 4 is connected to the seat belt retractor 3, which is an emergency locking retractor (ELR), to wind and retract the lap belt 4. The seat belt retractor 3 and the buckle 5 are arranged on opposite sides of a seat and arranged on the vehicle floor, or the like. The tongue 6 slides freely along the lap belt 4 and is engaged with the buckle 5 when fastening the seat belt. The belt guide 7 is secured to a body pillar, or the like, to guide the shoulder belt 2. The shoulder belt 2 is further connected to the gas generator 8. The gas generator 8 is actuated during emergency situations, such as when a collision occurs, to generate a gas product, which is drawn into the bag-like shoulder belt 2. The adjustor 9 adjusts the vertical position of the gas generator 8.

The shoulder belt 2 has a belt body 2c. The belt body 2c, for example, may be folded and covered by a cover 2d. The sides of the cover 2d are sewed to each other such that a stitching 2e is formed. This keeps the shoulder belt 2 in a strip-like state under normal situations.

The adjustor 9 has a vertically extending ball screw 9a, to which the gas generator 9a is screwed, and a motor 9b for rotating the ball screw 9a. When the motor 9b rotates the ball screw 9a, the gas generator 8 moves vertically in accordance with the rotating direction of the ball screw 9a. In other words, the end of the shoulder belt 2 connected to the gas generator 8 is moved vertically to adjust the shoulder belt 2 in accordance with the size of the passenger's body.

The above air belt device is kept in a strip-like state under normal situations.

The passenger sits on the seat and fastens the belt by inserting the tongue 6 into the buckle 5. If the length of the shoulder belt 2 and the lap 4 is inappropriate for the passenger, the motor 9b of the adjustor 9 is driven to move the gas generator 8 vertically and adjust the length of the belts 2, 4 to fit the passenger.

When a collision occurs, the gas generator 8 is actuated to generate gas and inflate the shoulder belt 2.

The inflated shoulder belt 2 holds the passenger and securely protects the passenger from great impact loads. Furthermore, the slack of the shoulder belt 2 is absorbed during the inflation. This enhances the passenger constraining force of the belt.

Japanese Unexamined Patent Publication No. 5-85301 describes an air belt device having a webbing connected to the bag-like shoulder belt. A shoulder belt retractor winds and retracts the webbing. Gas is drawn into the bag-like shoulder belt through a gas passage extending through the tongue and buckle. A gas generator is incorporated in the buckle. When the gas generator is actuated with the tongue and buckle in an engaged state, gas flows through the gas passage and enters the shoulder belt.

In the air bag device of Japanese Unexamined Patent Publication No. 5-112200, the gas generator 8 is connected to one end of the shoulder belt 2. This allows the adjustor 9, which includes the ball screw 9a and motor 9b, to adjust the vertical position of the gas generator 8. Due to this structure, the tension applied to the shoulder belt 2 lacks elasticity. Thus, the passenger may feel uncomfortable when fastening the seat belt. In other words, when a passenger tries to move his body, the shoulder belt 2, which is connected to the adjustor 9, constrains the passenger.

In the air bag device of Japanese Unexamined Patent Publication No. 5-85301, the webbing is connected to one end of the shoulder belt. The retractor winds and retracts the webbing. Thus, if the passenger tries to move his body, the webbing is pulled and extended from the retractor. This allows the passenger to move his body with ease. However, this air bag device requires a gas passage to be formed in the tongue and buckle. In addition, gas must be drawn into the shoulder belt without the gas leaking out of the joint between the fastened tongue and buckle. As a result, the structure of the tongue and the buckle is complicated.

SUMMARY OF THE INVENTION

Accordingly, it is an objective of the present invention to provide an air belt device that enables the shoulder belt to extend freely and enables the employment of an ordinary tongue and buckle.

To achieve the above objective, the present invention provides an air belt device including an inflatable shoulder belt, a gas generator provided within one of ends of the shoulder belt and a first guide member suspending a portion of the shoulder belt. The air belt device is characterized in that a first end of the webbing is connected with the shoulder belt and a second end of the webbing is wound up on a retractor.

In the air belt device, the webbing connected to one end of the shoulder belt is wound into and retracted by a retractor. Thus, when the passenger moves his body, the shoulder belt is extended from the retractor. Accordingly, the passenger's body is not constrained. Furthermore, the gas generator is arranged in the shoulder belt. This permits the employment of ordinary tongues and buckles that do not have gas passages.

In the present invention, it is preferable that vertical movement of the gas generator be guided by a second guide member. The second guide member includes a gas generator guide having a vertically movable body attached to a vehicle's body and a holder connected with the vertically movable body. The holder and shoulder belt clamp the gas generator disposed in the shoulder belt.

In the present invention, it is preferable that the first guide member include rollers for carrying the shoulder belt. Accordingly, the rollers of the first guide member decreases the resistance produced when guiding a bag-like belt.

The rollers have a plurality of teeth extending in a surface thereof in parallel with an axis of the roller. The teeth prevent the formation of wrinkles.

In the present invention, the retractor is disposed within a seat. If the seat is a rear seat, the retractor is disposed on the vehicle body behind the seat. It is preferable that the bag-like shoulder belt be pulled out in front a back rest.

Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

The accompanying drawings, which are incorporated in and constitute a part of the specification, illustrate a presently preferred exemplary embodiment of the invention, and, together with the general description given above and the detailed description of the preferred embodiment given below, serve to explain the principles of the invention.

BRIEF DESCRIPTION OF THE DRAWINGS

FIG. 2 includes structural views showing the joint between a shoulder belt and a webbing;

FIG. 6 includes structural views showing the shoulder belt;

FIG. 13 includes structural views showing a knit cover; and

DETAILED DESCRIPTION OF PREFERRED EMBODIMENT

Figure 1B:
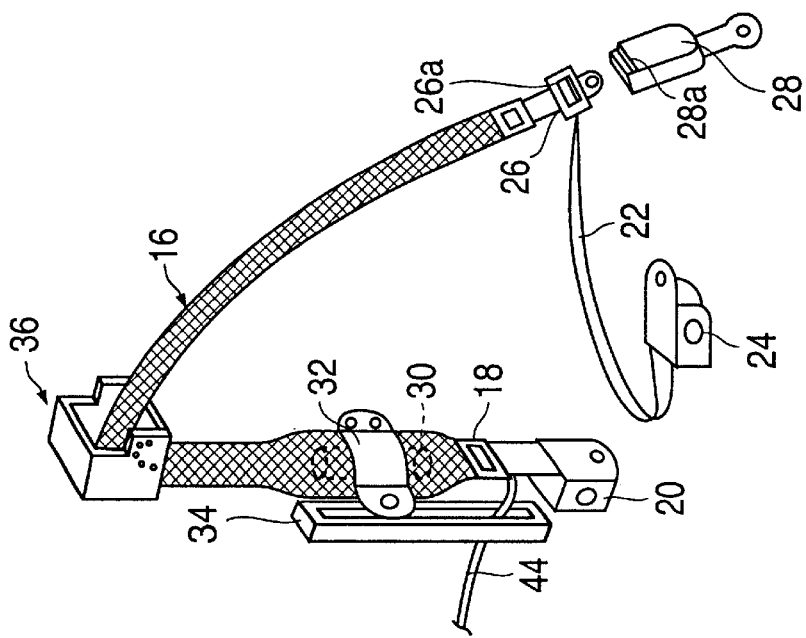
FIG. 1 includes perspective views showing a seat provided with an embodiment of an air belt device according to the present invention.
Figure 1A:
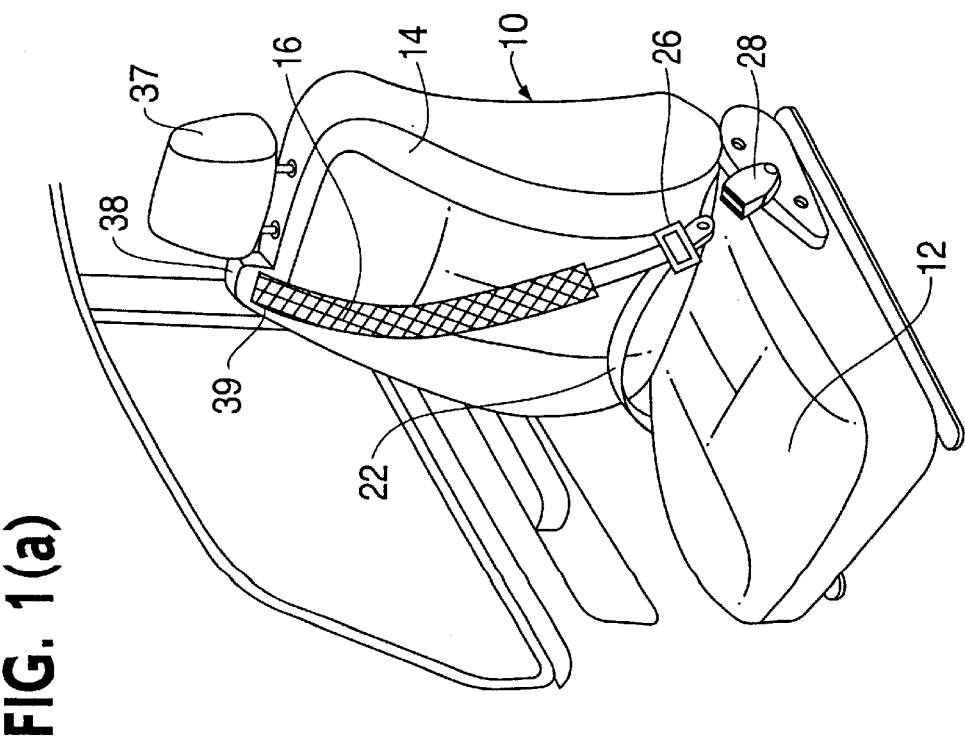
Figure 3A:
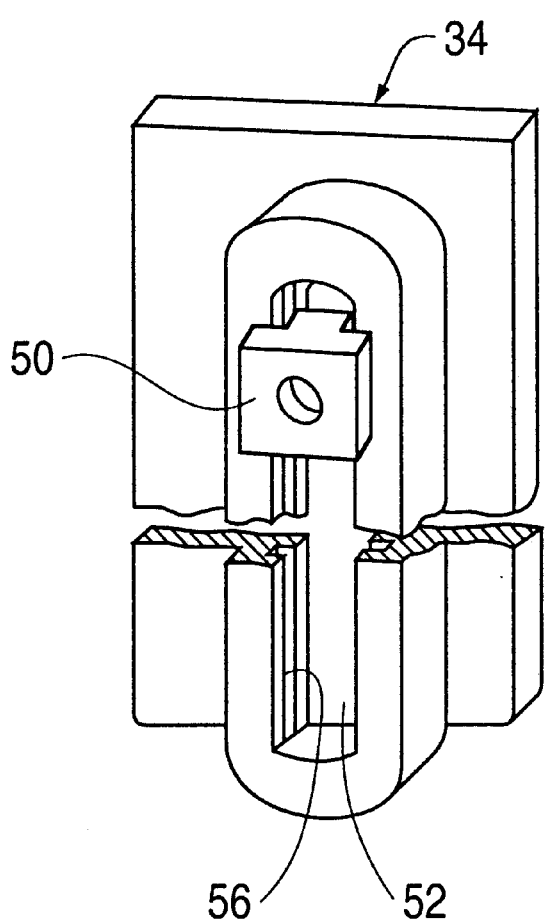
FIG. 3 includes structural views showing a guide rail.
Figure 3B:
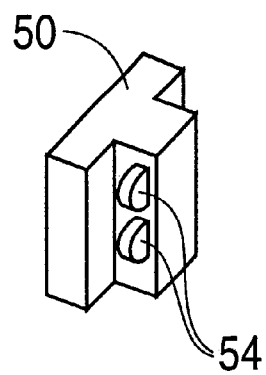
Figure 4:
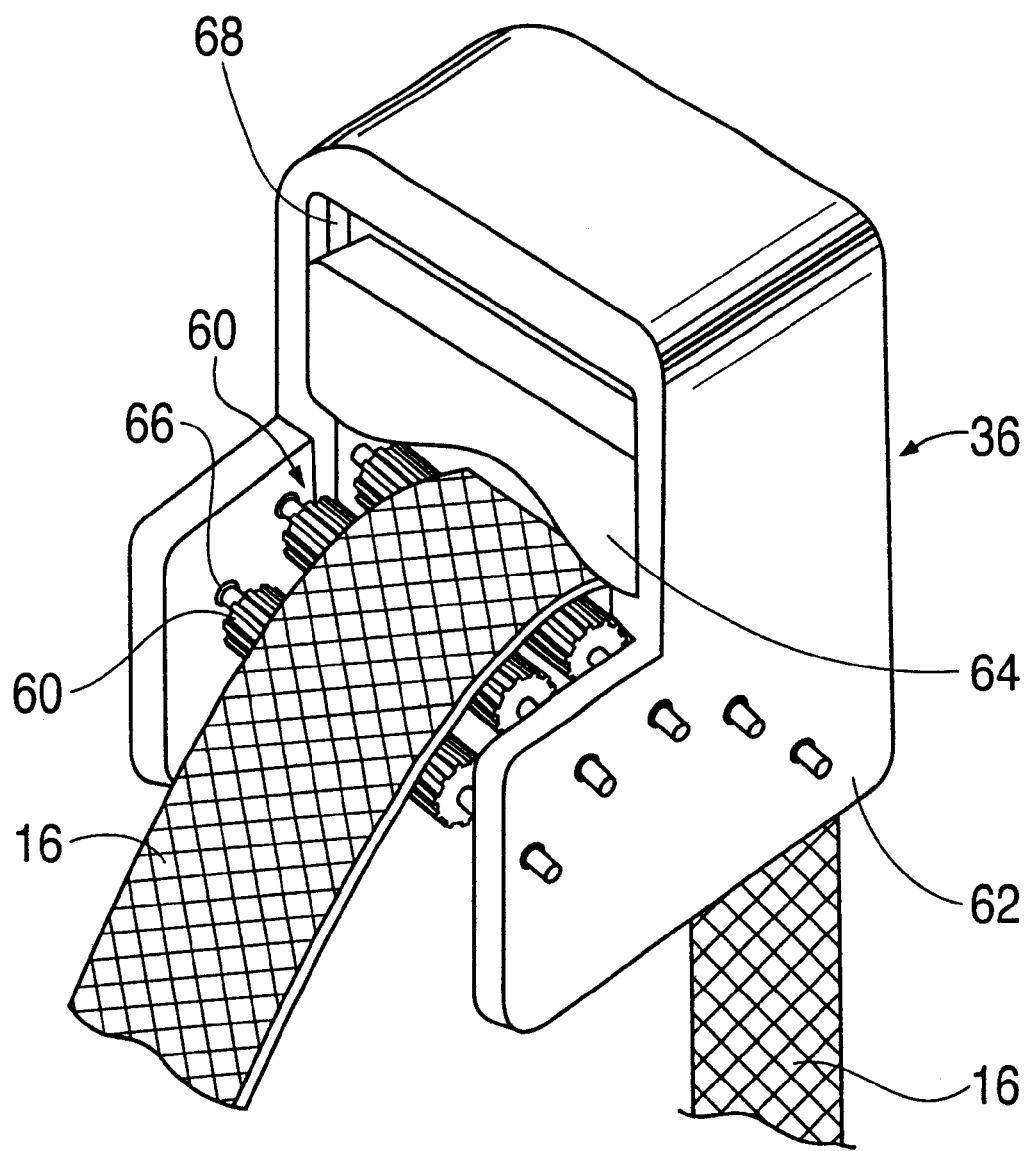
FIG. 4 includes structural views showing a belt guide.
Figure 5A:
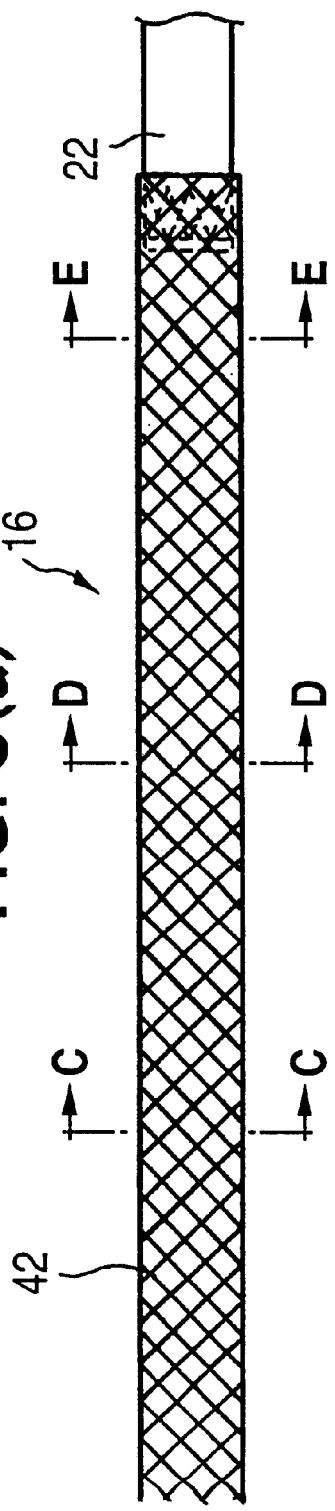
FIG. 5 includes structural views showing a shoulder belt.
Figure 5B:
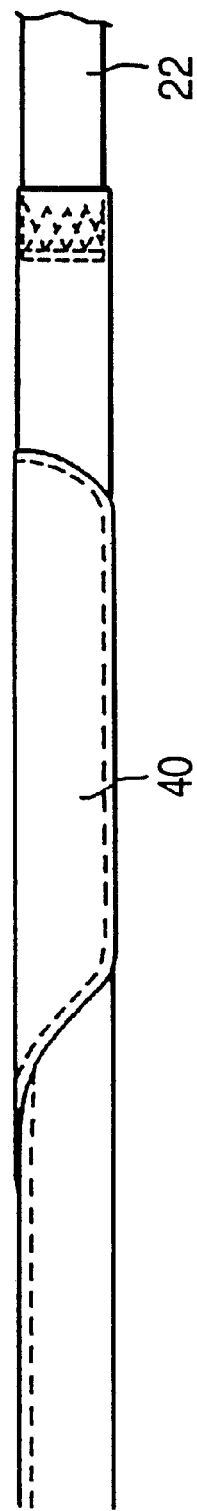
Figure 5C:
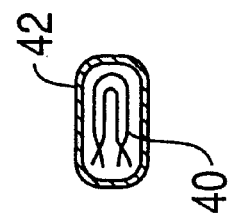
Figure 5D:
Figure 5E:
Figure 7:
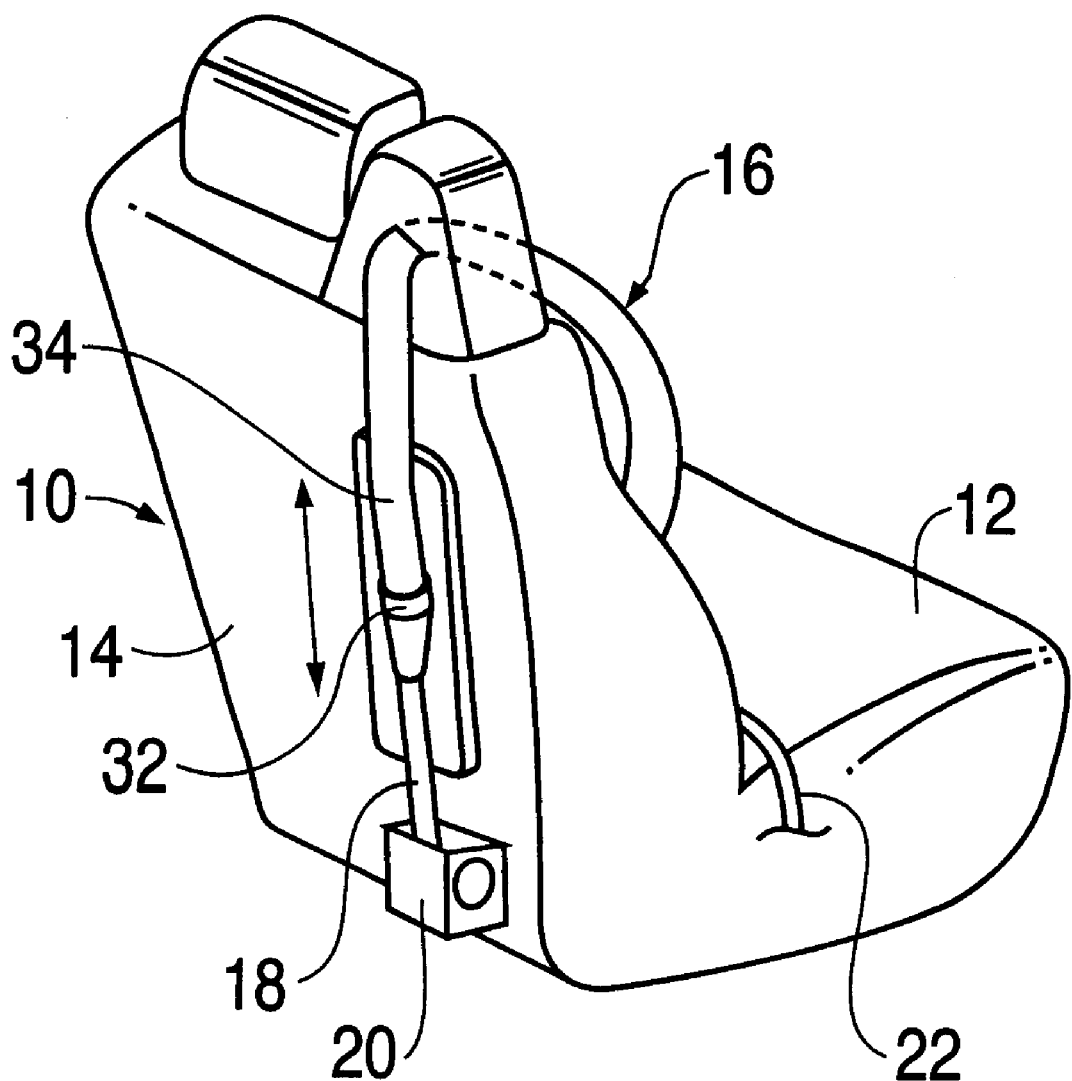
FIG. 7 is a perspective view showing the rear side of a seat provided with the air belt device according to the present invention.

An embodiment according to the present invention will now be described with reference to the drawings. FIG. 1(a) is a perspective view showing a seat provided with an embodiment of an air belt device according to the present invention. FIG. 1(b) is a perspective view of the air belt device. FIG. 2(a) is a perspective view showing the portion connecting a shoulder belt and a webbing. FIG. 2(b) is a cross-sectional view taken along line B—B in FIG. 2(a). FIG. 3(a) is a perspective view showing a guide rail. FIG. 3(b) is a perspective view showing a slider, which engages the guide rail. FIG. 4 is a perspective view showing a belt guide. FIG. 5(a) is a plan view showing the portion connecting the shoulder belt and the lap belt. FIG. 5(b) is a plan view showing a bag-like belt. FIGS. 5(c), (d), and (e) are cross-sectional views taken along lines C—C, D—D, E—E, respectively, in FIG. 5(a). FIG. 6(a) is a plan view showing the shoulder belt with the air belt in an inflated state. FIG. 6(b) is a plan view showing the bag-like belt in an inflated state. FIGS. 6(c) and 6(d) are cross-sectional views taken along lines C—C, D—D, respectively, taken in FIG. 6(a). FIG. 7 is a perspective view showing the rear of a seat provided with the air belt device according to the present invention.

A seat 10, equipped with an air bag device according to the present invention, includes a seat cushion 12 and a back rest 14, which extends from the rear of the seat cushion 12.

The air belt device, which protects the passenger sitting in the seat 10, includes a shoulder belt 16, a webbing 18, a shoulder belt retractor 20, a lap belt 22, a lap belt retractor 24, a tongue 26, a buckle 28, a gas generator 30, a retainer 32, a guide rail 34, and a belt guide 36. The webbing 18 is connected to one end of the shoulder belt 16. The shoulder belt retractor 20 winds and retracts the webbing 18. The other end of the shoulder belt 16 is connected to the lap belt 22. The lap belt retractor 24 winds and retracts the lap belt 22. The tongue 26 has an opening 26a, through which the lap belt 22 is inserted, and is fastened to the buckle 28. The gas generator 30 is arranged in the shoulder belt 16 at the end connected with the webbing 18. The retainer 32 holds the gas generator 30 and the shoulder belt 16 integrally with each other. The guide rail 34 guides the vertical movement of the retainer 32. A middle portion of the shoulder belt 16 is suspended on the belt guide 36.

As shown in FIG. 1(a), a head rest 37 is mounted on the seat 10. A projection 38 projects from the seat 10 adjacent to the head rest 37. The belt guide 36 is arranged in the projection 38. The portion of the shoulder belt 16 extending downward from the belt guide 36, the webbing 18, the guide rail 34, and the shoulder retractor 20 are arranged in the projection 38. The projection 38 has a front surface on which a slot 39 is defined. The portion of the shoulder belt 16 extending frontward from the belt guide 36 is pulled out of the slot 39 in front of the back rest 14.

Figure 14:
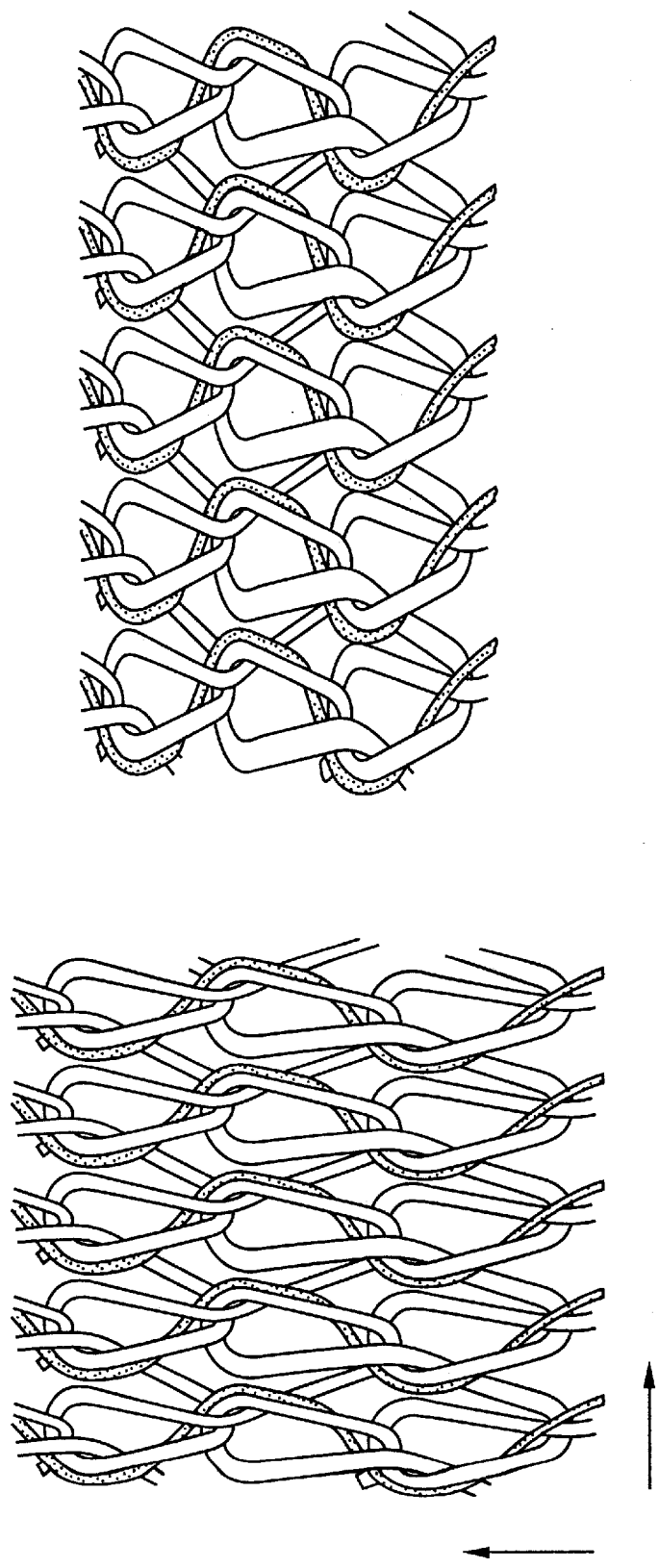
FIG. 14 includes structural views showing the knit cover.

As shown in FIGS. 5 and 6, the shoulder belt 16 includes a bag-like belt 40, and a knit cover 42, which covers the bag-like belt 40 and is made of a fabric. The bag-like belt 40 has a wide portion. The wide portion extends between the chest and the abdomen of a passenger seated on the seat 10. As shown in FIG. 5, the wide portion is folded to form a long strip-like portion. The knit cover 42 expands and contracts flexibly in a direction substantially perpendicular to the longitudinal direction of the knit cover 42. However, since the knit cover 42 is thermally drawn, the knit cover 42 substantially does not expand or contract flexibly in its longitudinal direction. The shoulder belt 16 and the lap belt 22 are sewed to each other. The bag-like belt 40 and the knit cover 42 are sewed to the lap belt 22. The knit cover 42 receives the tensile force applied to the shoulder belt 16. The left drawings shown in FIGS. 13 and 14 show examples of how the knit cover 42 is knitted. FIG. 13 shows the knit cover 42 warp knitted in an ordinary manner. The knit cover 42 shown in FIG. 14 uses an inlay yarn to reinforce the knit cover 42. This permits the thickness of the knit cover 42 to be decreased.

As shown in FIG. 2, the gas generator 30 arranged in the shoulder belt 16 is cylindrical and contains a gas generating agent. Electric current flows through a harness 44 to initiate reaction of the gas generating agent and instantaneously produce a large amount of gas. A groove 46 extends along the peripheral surface of the gas generator 30. The retainer 32 is clamped by bolts 47 such that the shoulder belt 17 is pressed into the groove 46.

The retainer 32 is connected to a slider 50, which is shown in FIG. 3. The guide rail 34 has a guide slit 52 to receive the slider 50 and permit vertical movement of the slider 50. Four wheels 54 are provided on the sides of the slider 50. Wheel guide grooves 56 extend along the inner wall of the guide slit 52 to receive the wheels 54. The slider 50 moves smoothly in the guide slit 52 when the shoulder belt 16 is pulled to extend the webbing 18 from the shoulder belt retractor 20 or when the shoulder belt retractor 20 winds and retracts the webbing 18 into the retractor 20.

As shown in the enlarged view of FIG. 4, the belt guide 36 has a plurality of rollers 60, which are rotatably supported by a roller housing 62, to guide the shoulder belt 16. The shoulder belt 16 is guided along the rollers 60 in a direction perpendicular to the axes of the rollers 60. A plurality of teeth 66 extend axially along the peripheral surface of each roller 60. The teeth 66 functions to straighten the shoulder belt 16 and thus prevent the formation of wrinkles on the shoulder belt 16.

The belt guide 36 includes a slide block 64, which moves freely in the vertical direction. The movement of the slide block 64 is guided by block guide grooves 68, which extend vertically along the inner surface of the roller housing 62. The slide block 64 is employed to keep the shoulder belt 16 held on the rollers 60. When the shoulder belt 16 is inflated, the shoulder belt 16 pushes the slide block 64 upward. Thus, gas flows smoothly into the entire shoulder belt 16.

The operation of the air belt device will now be described. When sitting on the seat 10, the passenger fastens the tongue 26 to the buckle 28. This extends the webbing 18 and the lap belt 33 out of the associated retractors 20, 24. When the passenger sits straight with the tongue 26 fastened to the buckle 28, the loose portions of the webbing 18 and the lap belt 22 are retracted into the associated retractors 20, 24. Thus, the shoulder belt 16 and the lap belt 22 are adjusted to fit the passenger such that a light tension is applied on the passenger. The tongue 26 is separated from the buckle 28 by pressing a press button 28a provided on the buckle 28, as shown in FIG. 1(b). When the tongue 26 is separated from the buckle 28, the webbing 18 and the lap belt 22 are wound and retracted into the associated retractors 20, 24. The retainer 32, which holds the gas generator 30, moves vertically along the guide rail 34 as the webbing 18 moves out of and into the retractor 20.

When a collision occurs with the tongue 26 fastened to the buckle 28, a collision detection sensor generates a signal. The signal causes electric current to flow through the gas generator 30 by way of the harness 44a. As a result, the gas generator 30 generates gas. The gas then enters and inflates the bag-like belt 40 instantaneously. The inflated shoulder belt 16 constrains the passenger to the seat 10 and absorbs the impact applied by the seat belt 16 to the passenger's body. The inflation of the bag-like belt 40 shortens the length of the shoulder belt 16 such that the shoulder belt 16 fits tightly on the passenger. Thus, the passenger is securely constrained to the seat 10. The right drawings shown in FIGS. 13 and 14 show how the length of the knit cover 42 is shortened when the shoulder belt 16 (bag-like belt 40) is inflated. As described above, the knit cover 42 does not expand in the longitudinal direction of the shoulder belt 16 since the cover 42 is formed by thermal drawing. However, inflation of the bag-like belt 40 widens the knitted loops of the knit cover 42 in a direction perpendicular to the longitudinal direction of the shoulder belt 16. This shortens the length of the knit cover 42 and consequently the length of the shoulder belt 16.

In the air belt device of this embodiment, the gas generator 30 is arranged in one end of the bag-like belt 40 of the shoulder belt 16. Thus, ordinary tongues and buckles, which do not have gas passages, may be employed as the tongue 26 and the buckle 28. Furthermore, the webbing 18 is connected to one end of the shoulder belt 16 and wound into the shoulder belt retractor 20. Thus, if the passenger moves his body when sitting on the seat 10, the shoulder belt 16 extends from and retracts into slot 39 freely. Accordingly, the passenger can move his body without constraint and thus sit comfortably. When a collision occurs, the shoulder belt retractor 20 and the lap belt retractor 22 are locked. Hence, the shoulder belt 16 and the lap belt 22 do not extend during collisions.

As described above, the belt guide 36 has rollers 60 provided with teeth 66. This prevents wrinkling of the shoulder belt 16. Accordingly, the shoulder belt 16 is extended from and retracted into the slot 39 smoothly.

Figure 8:
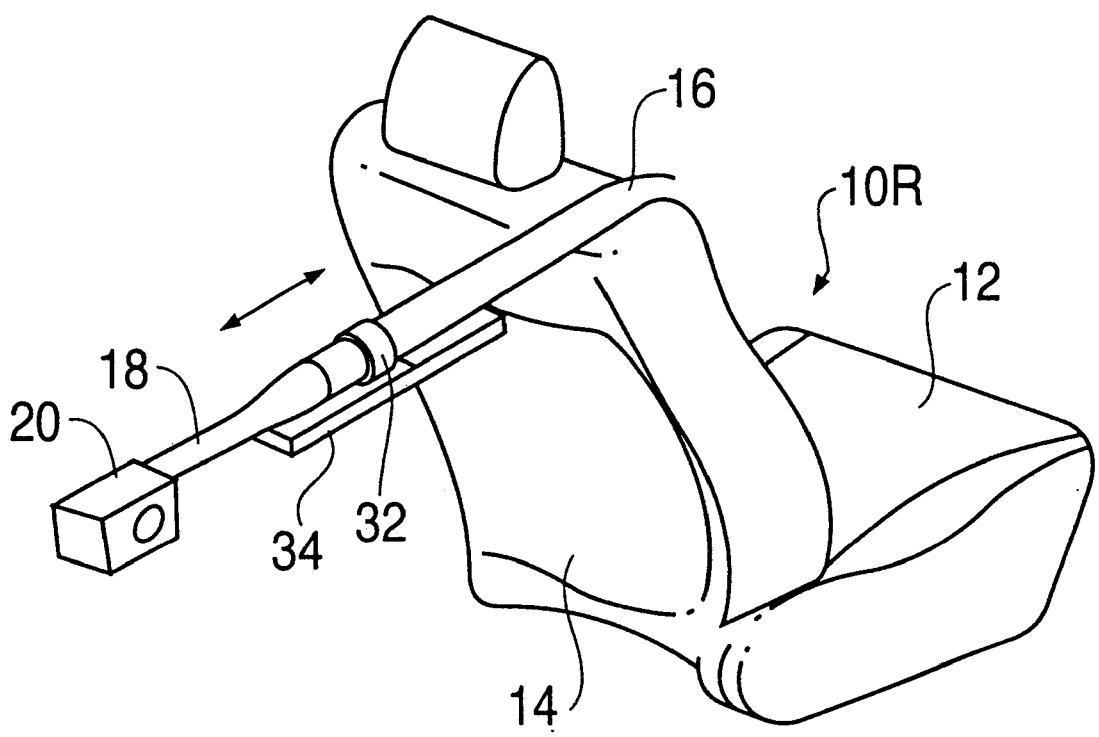
FIG. 8 is a perspective view showing a rear seat provided with the air belt device according to the present invention.

In the above embodiment, the present invention is applied to a seat 10, which includes a driver's seat or a front passenger seat of an automobile. However, as shown in FIG. 8, the present invention may also be applied to a rear passenger seat 10R. In such case, the shoulder belt retractor 20, and the guide rail 34 are fixed to a body member (not shown), which is located behind the rear passenger seat 10R.

Figure 9:
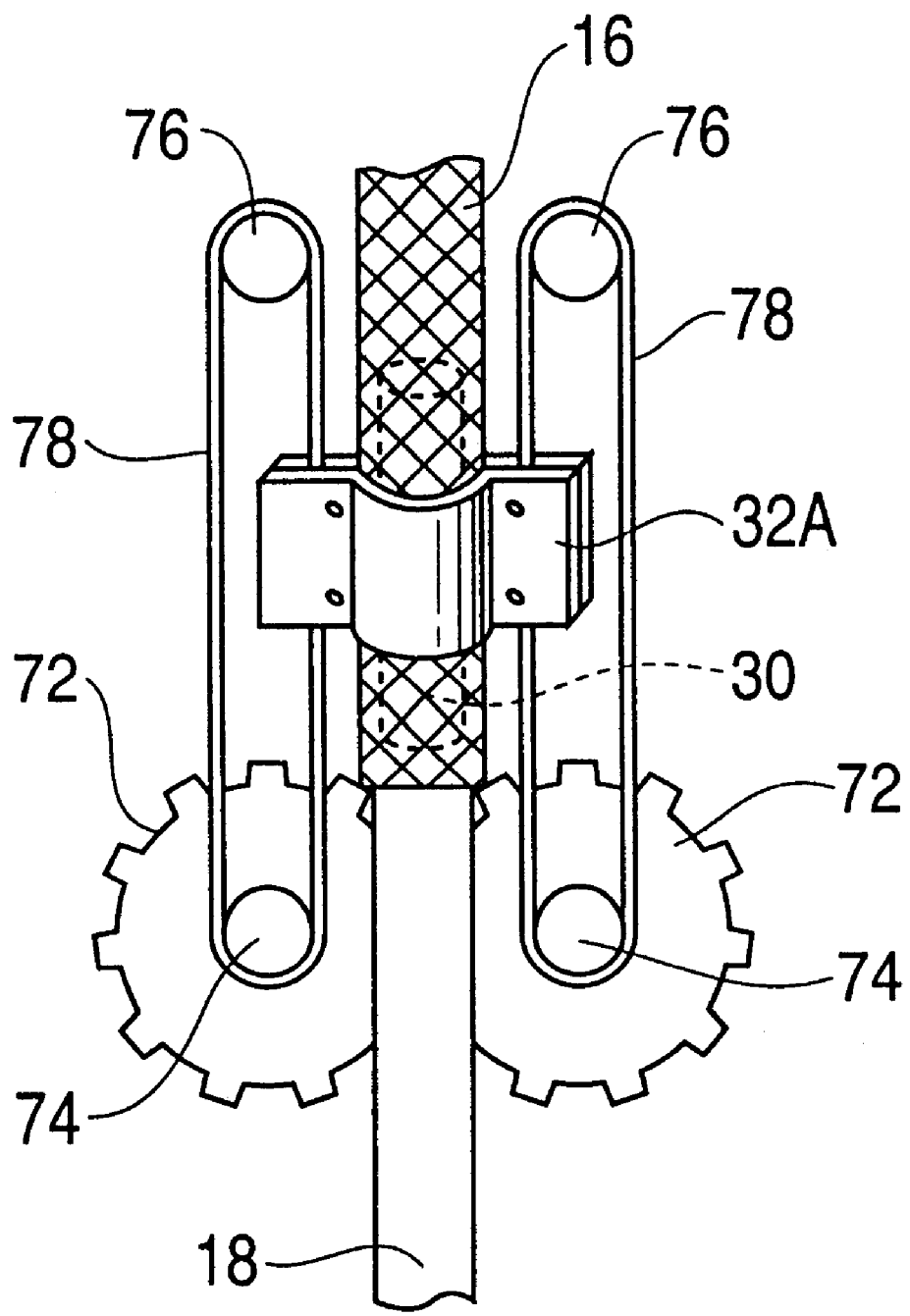
FIG. 9 is a structural view showing the portion connecting a shoulder belt and a webbing in a further embodiment according to the present invention.

A guide of a gas generator employed in a further embodiment according to the present invention is shown in the structural drawing of FIG. 9. In this embodiment, a guide has a pair of gears 72, which are meshed with each other. A pulley 74 is fixed to each gear 72. A further pulley 76 is arranged above each pulley 74. An endless belt 78 connects the associated pulleys 74, 76 to each other. A retainer 32A, which retains the gas generator 30, is connected to the endless belt 78. The gears 72 and the pulleys 76 are rotatably secured to a base block (not shown), which is fixed to a body member. In the guide of FIG. 9, the retainer 32A is guided by the endless belt 78 when the shoulder belt 16 is extended or retracted. Thus, the guide vertically moves the shoulder belt 16 in a smooth manner. The meshed gears 72 synchronizes the rotation of the left and right endless belts 78 to smoothly move the retainer 32A along the endless belts 78.

Figure 10:
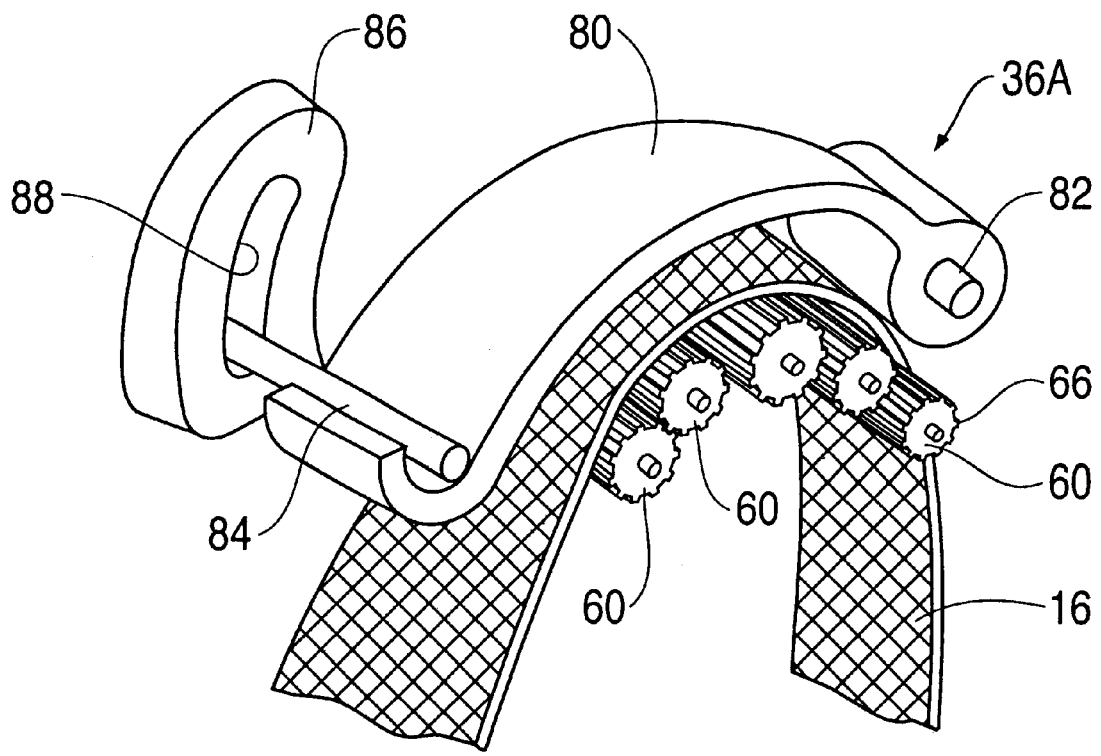
FIG. 10 is a perspective view showing a belt guide employed in a further embodiment according to the present invention.

FIG. 10 is a perspective view showing a belt guide 36A employed in a further embodiment according to the present invention. The belt guide 36A has a plurality of rollers 60, each arranged so that its axis extends in a direction perpendicular to the moving direction of the shoulder belt 16. A belt pressing arm 80 is located above the rollers 60 to press the shoulder belt 16 from above. The belt pressing arm 80 has a proximal end, which includes an arm support shaft 82. The arm support shaft 82 is pivotally supported by the roller housing (not shown in FIG. 10) such that the distal end of the belt pressing arm 80 pivots about the support shaft 82. A stopper rod 84 is arranged above the belt pressing arm 80. A rod guide 86 has a slit 88 to receive the stopper rod 84 such that the stopper rod 84 is vertically movable. When the shoulder belt 16 is not inflated, the belt pressing arm 80 presses the shoulder belt 16 against the rollers 60 lightly. The inflation of the shoulder belt 16 lifts and pivots the belt pressing arm 80 upward about the arm support shaft 82. Thus, the shoulder belt 16 is inflated smoothly. When the stopper rod 84 abuts against the top end of the wall of the slit 88, further pivoting of the belt pressing arm 80 is restricted. This curves the shoulder belt 16 smoothly along the belt pressing arm 80 as the shoulder belt 16 inflates.

Figure 11A:
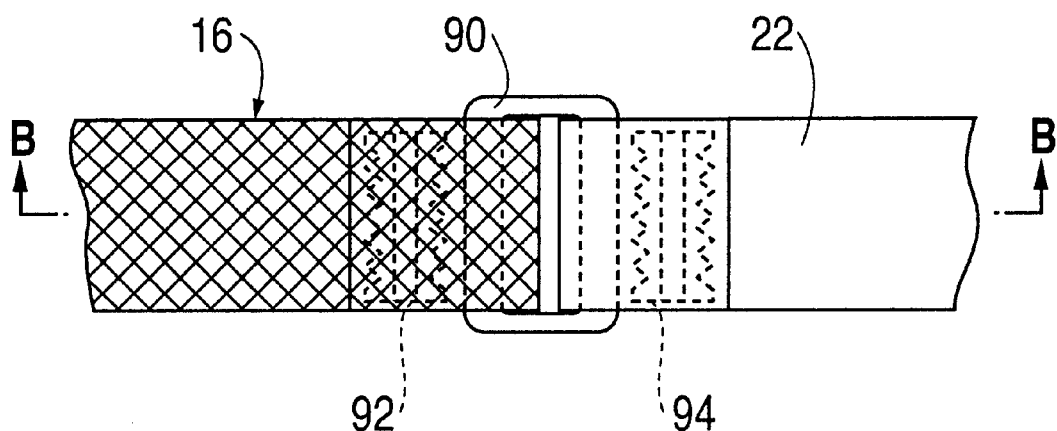
FIG. 11 includes structural views showing the joint between a shoulder belt and a lap belt employed in a further embodiment according to the present invention.
Figure 11B:
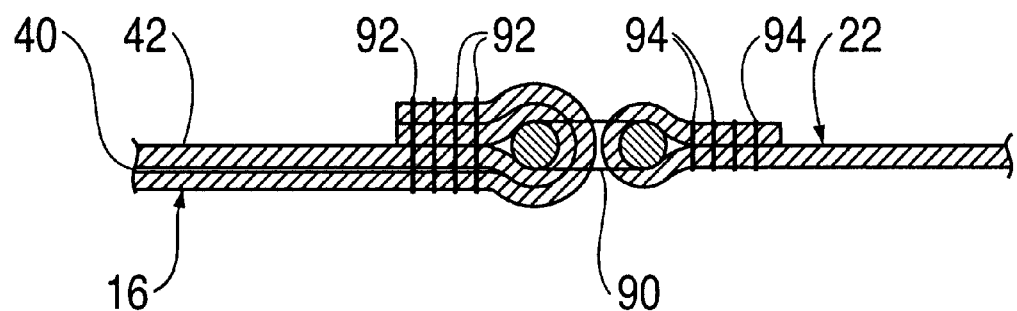
Figure 12A:
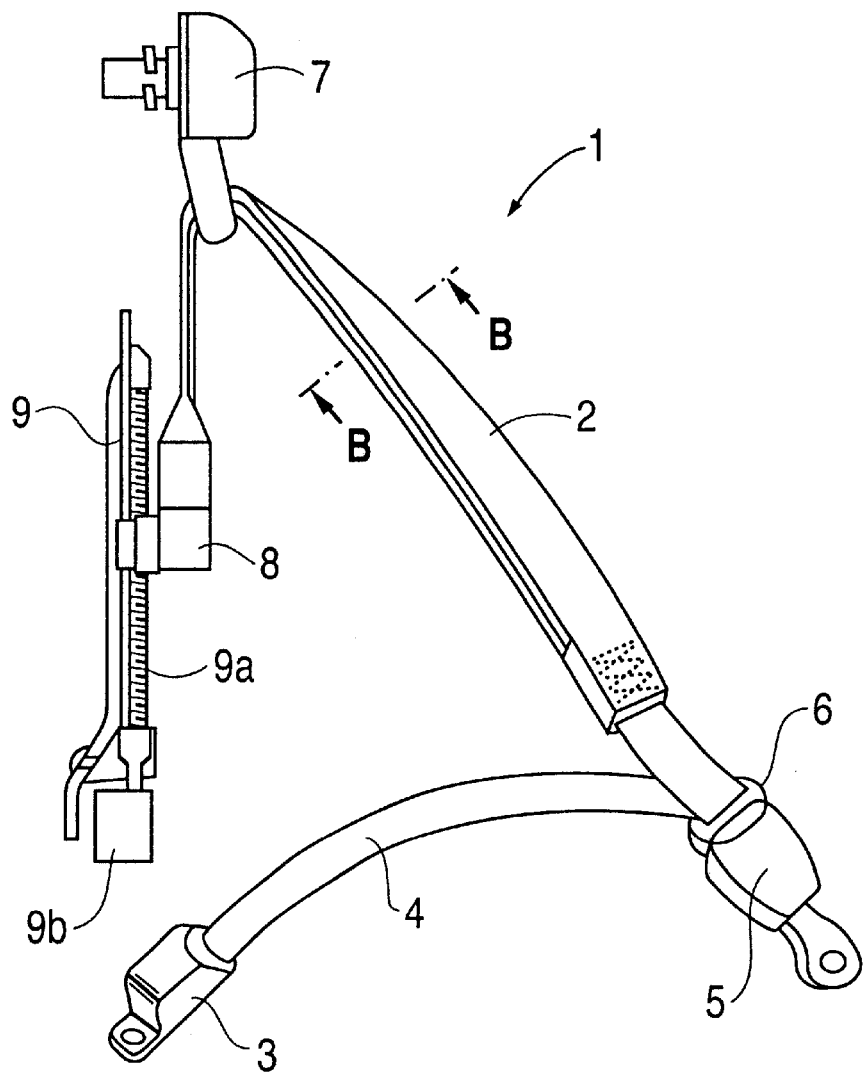
FIG. 12 includes structural views showing a prior air belt device.
Figure 12B:
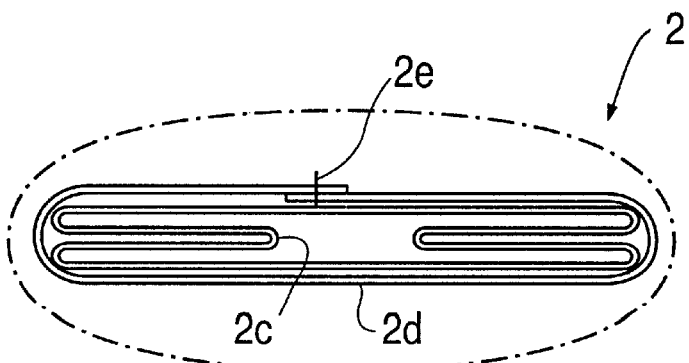

In the above embodiments, the shoulder belt 16 and the lap belt 22 are sewed to each other. However, as shown in FIG. 11, the shoulder belt 16 and the lap belt 22 may be connected to each other by a square frame-like connecting ring 90. FIG. 11(a) is a plan view showing the joint between the shoulder belt 16 and the lap belt 22. FIG. 11(b) is a cross-sectional view taken along line B—B in FIG. 11(a). As shown in FIG. 11(b), the distal ends of the shoulder belt 16 and the lap belt 22 are inserted through the connecting ring 90 and bent backward in an overlapping manner. The overlapped portions of the belts 16, 22 are sewed and connected to each other. By sewing the belts 16, 22 together in this manner, the force transmitted between the belts 16, 22 is distributed over a wide area. In FIG. 11, reference numerals 92, 94 denote sewing threads used to sew the overlapping portions of the belts 16, 22.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

The accompanying drawings, which are incorporated in and constitute a part of the specification, illustrate a presently preferred exemplary embodiment of the invention, and, together with the general description given above and the detailed description of the preferred embodiment given below, serve to explain the principles of the invention.

This application is one of seven copending applications filed on even date herewith:

| U.S. Ser. No. | Our Docket No. | Japanese Application No. |
|---|---|---|
| Unknown | 086142/0203 | 09-236903 |
| Unknown | 086142/0204 | 09-236904 |
| Unknown | 086142/0205 | 09-236906 |
| Unknown | 086142/0206 | 09-236907 |
| Unknown | 086142/0207 | 09-236908 |
| Unknown | 086142/0208 | 09-236909 |
| Unknown | 086142/0209 | 09-236910 |

The instant application hereby incorporates by reference the entire specification including claims and abstract and the drawings of each of the other six applications.

What is claimed is:

1. An air belt device comprising:
   an inflatable shoulder belt having first and second ends,
   a webbing,
   a gas generator provided entirely within the webbing at one of the ends of the shoulder belt,
   a retainer outside of said webbing, said retainer holding said gas generator integral with said webbing to prevent relative motion between the generator and the webbing and
   a first guide member suspending a portion of the shoulder belt,
   said air belt device being characterized in that a first end of the webbing is connected with the shoulder belt and a second end of the webbing is wound up on a retractor.

2. An air belt device as set forth in claim 1, characterized by a second guide member for guiding a vertical movement of the gas generator.

3. An air belt device as set forth in claim 2, characterized in that said second guide member includes a gas generator guide having a vertically movable body attached to a vehicle's body and a holder connected with the vertically movable body, wherein said holder and shoulder belt clamp the gas generator disposed in the shoulder belt.

4. An air belt device as set forth in claim 3, characterized in that said first guide member includes rollers carrying the shoulder belt.

5. An air belt device as set forth in claim 4, characterized in that each of said rollers has a plurality of teeth extending in a surface thereof in parallel with an axis of the roller.

6. An air belt device as set forth in claim 5, characterized in that said retractor is disposed within a seat in the vehicle, said shoulder belt extends through a back rest of the seat and is forwardly pulled out of the back rest through an opening provided in an upper portion of the back rest.

7. An air belt device as set forth in claim 6, characterized in that said retractor is mounted on a portion at the back of a rear seat in the vehicle, and said shoulder belt extends to a front side of the back rest.

8. An air belt device as set forth in claim 7 characterized by a lap belt having a distal end connected with the other one of the ends of the shoulder belt and a proximal end connected with a retractor for the lap belt, said lap belt extends through a belt receiving opening of a tongue, and a buckle for receiving the tongue is provided.

9. An air belt device as in claim 2, wherein the pyrotechnical explosion of the gas generator produces a force driving the generator along the second guide member in a downward direction.

10. An air belt device as in claim 9, wherein the downward motion of the gas generator causes a portion of the webbing below the gas generator to slacken.

11. An air belt device as in claim 10, wherein the retractor retracts the slackened webbing.

* * * * *